United States Patent [19]
Gates

[11] 3,731,543
[45] May 8, 1973

[54] GYROSCOPIC BORESIGHT ALIGNMENT SYSTEM AND APPARATUS

[75] Inventor: Robert L. Gates, Littleton, Colo.
[73] Assignee: The Singer Company, Little Falls, N.J.
[22] Filed: Jan. 28, 1972
[21] Appl. No.: 221,694

[52] U.S. Cl. ......................73/504, 73/510, 33/318
[51] Int. Cl. ...............................................G01c 19/02
[58] Field of Search.......................33/321, 328, 1 N, 33/236, 318; 73/504, 510; 235/151.3

[56] References Cited
UNITED STATES PATENTS
2,715,274  8/1955  James....................................33/236

Primary Examiner—James J. Gill
Attorney—S. A. Giarratana et al.

[57] ABSTRACT

An improved system is provided for determining boresight misalignments of equipment, such as guns, radar antennas, cameras, gunsights, rocket launch rails, and the like, of carrier-based aircraft. The system of the invention utilizes intertial sensors which respond to the rotational rates of the aircraft carrier itself, and which use such rates as signal sources for the determination of angular boresight misalignments with respect to the armament data reference line of the particular aircraft. The system of the invention comprises a master sensor unit which contains two gyroscopes, and which is mounted on the aircraft during the test in position to extend along the armament data reference line. The system also includes a remote sensor unit which contains a single gyroscope, and which is mounted during the test on the actual equipment whose boresight misalignment is to be measured with respect to the aforesaid armament data reference line. The system of the invention compares the angular rates of the aircraft at the data line and at the equipment boresight axis to determine any misalignments of the boresight axis with respect to a parallel relationship with the armament data line.

7 Claims, 6 Drawing Figures

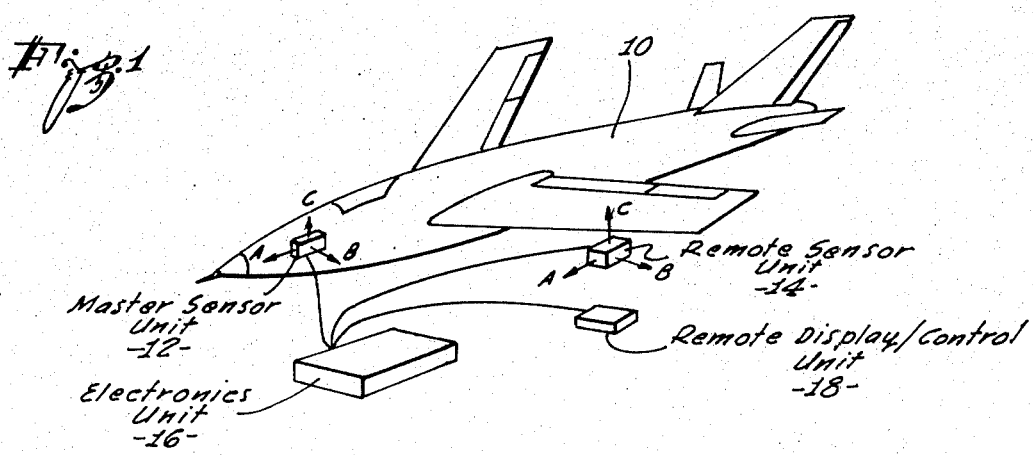

Fig. 1

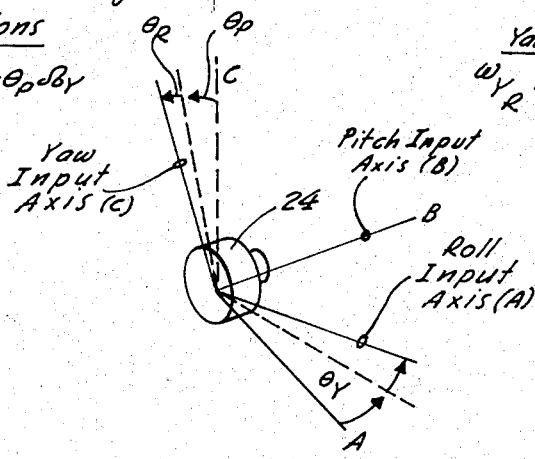

Fig. 2A (Remote Sensor Unit -14-)

Roll Axis Equations
$$\omega_{R_R} = \delta_{b_R} + \theta_Y \delta_{b_P} + \theta_P \delta_{b_Y}$$

Yaw Axis Equations
$$\omega_{Y_R} = \delta_{b_Y} - \theta_R \delta_{b_P} - \theta_P \delta_{b_R}$$

Fig. 2B (Master Sensor Unit -12-)

$$\omega_{R_M} = \delta_{b_R} \qquad \omega_{Y_M} = \delta_{b_Y}$$

Differencing
$$\omega_{R_R} - \omega_{R_M} = \theta_Y \delta_{b_P} + \theta_P \delta_{b_Y}$$

Differencing
$$\omega_{Y_R} - \omega_{Y_M} = -\theta_R \delta_{b_P} - \theta_P \delta_{b_R}$$

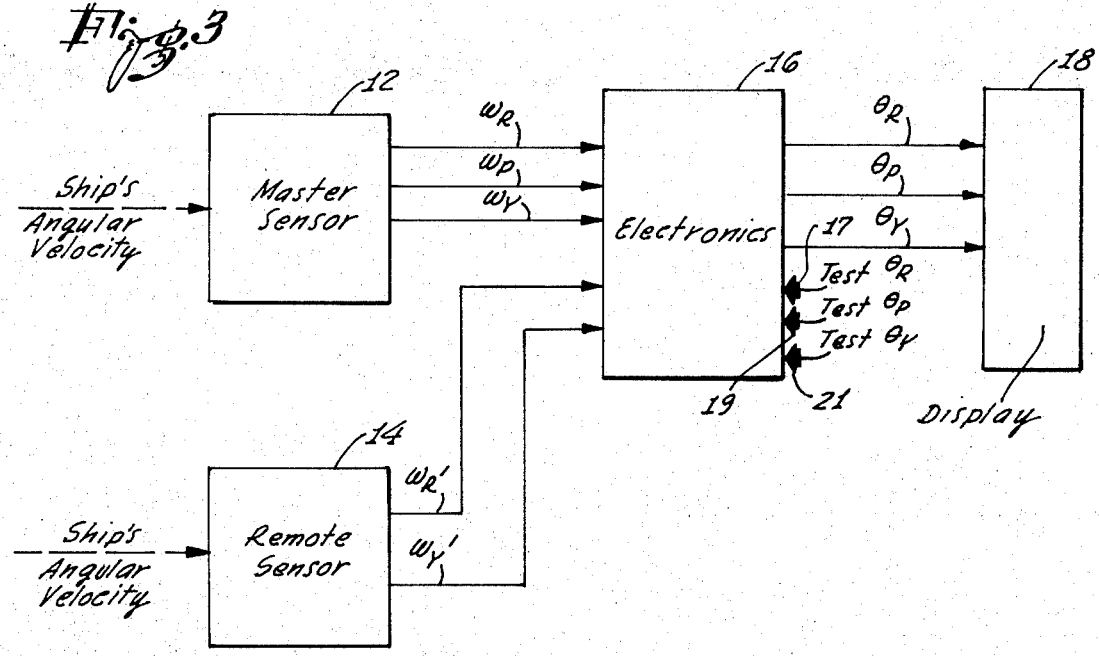

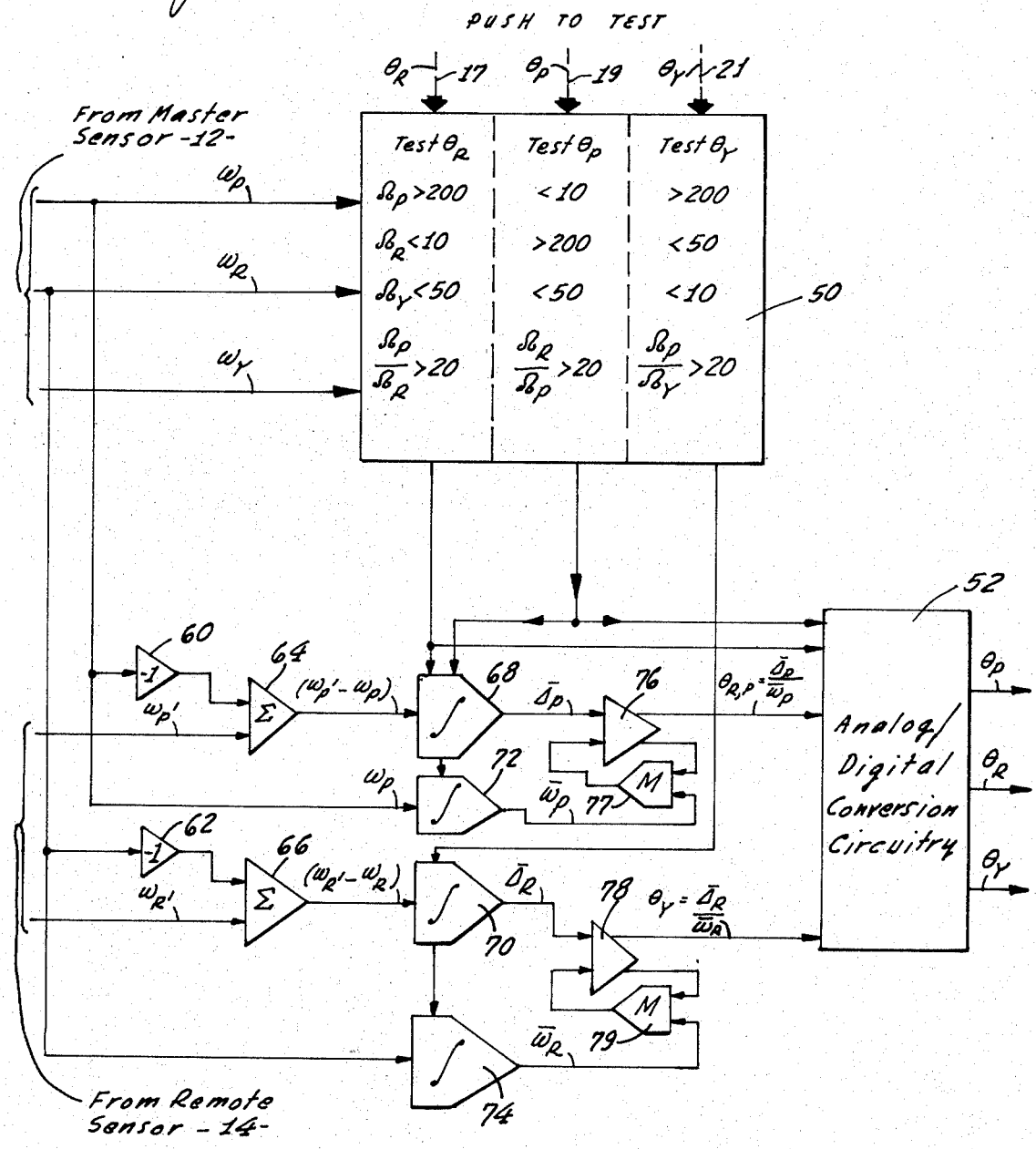

GYROSCOPIC BORESIGHT ALIGNMENT SYSTEM AND APPARATUS

BACKGROUND OF THE INVENTION

It is evident that, for appropriate electronic or other control of the various equipment in an aircraft, such as its guns, radar antenna, cameras, and the like, it is necessary for the boresights of such equipment to be precisely aligned and parallel with a reference axis of the aircraft, which is usually referred to as the "armament data line". For that reason, it is necessary to conduct periodic tests of the equipment on each aircraft, to assure that the aforesaid boresights are properly aligned with respect to the armament data line of the aircraft.

Problems have arisen in the past in the case of carrier-based aircraft, since it is most desirable to conduct the necessary boresight alignment tests while the carrier is at sea. However, the usual prior art systems for testing boresight alignment are in themselves awkward and complex, and are not feasible for use on a carrier.

For example, one prior art boresight alignment system utilizes a telescope which is mounted on the equipment whose boresight is to be tested, in position to extend along an axis parallel to the aforesaid boresight. The telescope is then sighted on a target area which is established a predetermined distance in front of the aircraft. However, such a system is not particularly feasible for use on an aircraft carrier because of the lack of available space.

Another prior art boresight misalignment technique involves the use of an optical system which involves a horseshoe-shaped structure mounted over the nose of the aircraft whose equipment is being tested. This structure serves as a cradle for supporting autocollimating instruments, and these instruments operate in conjunction with appropriate mirrors which are mounted on the equipment being tested to achieve the desired results.

Although the latter prior art system is suitable for use at sea to conduct limited tests on the equipment on carrier-based aircraft, it is not satisfactory for all purposes. Particularly, the system does not permit alignment of the equipment about the roll axis, and such alignment is important when offset aim points are used, as is often the case. This system also has a disadvantage in that it is excessively cumbersome and heavy; and in that it is delicate in its construction and operation and requires highly skilled operators.

The system of the present invention is particularly constructed for testing boresight alignments of aircraft equipment at sea, and for overcoming the drawbacks of the prior art systems. The system of the invention, as will be described, uses inertial sensors. Specifically, and as mentioned above, the embodiment to be described includes a master sensor unit which, for example, contains two gyroscopes, and which also includes a remote sensor unit containing a single gyroscope. The master sensor unit is rigidly mounted on the aircraft under test at a position on the aircraft defining the armament data line, and the remote sensor unit is mounted on the equipment whose boresight misalignment is to be measured. The gyroscopes in the master sensor unit and in the remote sensor unit are then operated. The resulting signals derived from the master sensor unit and from the remote sensor unit are utilized by appropriate electronic circuitry, as will be described, to determine the boresight misalignments which may exist in the equipment being tested.

BRIEF DESCRIPTION OF THE DRAWINGS

FIG. 1 is a perspective representation of a carrier-based aircraft, and a block representation of the system of the invention, showing the manner in which the various units of the system are mounted on the aircraft;

FIG. 2A is a schematic representation of the single gyroscope contained in the remote sensor unit;

FIG. 2B is a schematic representation of the two gyroscopes contained in the master sensor unit;

FIG. 3 is a block diagram of the system of the invention;

FIG. 4 is a logic diagram of certain electronics which are included within the system; and FIG. 5 is an observation criteria table useful in explaining the operation of the system.

DETAILED DESCRIPTION OF THE ILLUSTRATED EMBODIMENT

The carrier-based aircraft 10 shown in FIG. 1 is positioned on the carrier flight deck, or in the carrier hangar, and the boresight alignment test of its equipment is conducted while the carrier is at sea. In order to conduct the test, a master sensor unit 12 and a remote sensor unit 14 are mounted on the aircraft, and these units are connected to an electronics unit 16 which, in turn, is connected to a remote display/control unit 18. The units 12, 14, 16 and 18 form the system of the invention. The master sensor unit 12 includes two gyroscopes designated 20 and 22 positioned as shown in FIG. 2B; whereas the remote sensor unit 14 includes a single gyroscope 24, positioned such as shown in FIG. 2A.

The master sensor unit 12 includes an adapter to permit it to be attached in a precisely aligned position on the part of the aircraft 10 which defines the armament data line. The remote sensor unit 14, on the other hand, is equipped with different adapters to permit its attachment to the various equipments of the aircraft, such as its guns, radar antenna, gun sights, rocket launch rails, camera assemblies, and the like, whose boresights are to be tested for angular misalignments.

The master sensor unit 12 and the remote sensor unit 14 are preferably individually temperature controlled, and the input axes of the individual gyroscopes are aligned with appropriate reference pads to an accuracy of less than 30 arc seconds, for example. The input axes of the master sensor 12 and remote sensor 14 are aligned with the respective roll input axis (A), pitch input axis (B) and yaw input axis (C), as shown in FIGS. 2A and 2B. The roll axis A in FIG. 2B defines the armament data line, and the roll axis A in FIG. 2A defines the boresight axis.

As shown in FIG. 3, the master sensor unit supplies three outputs $(\omega_R)$, $(\omega_B)$ and $(\omega_Y)$ to the electronics unit 16, whereas the remote sensor 14 supplies two outputs $(\omega_{R'})$ and $(\omega_{Y'})$ to the electronics unit. These outputs represent respectively, the angular velocity of the aircraft carrier about the roll, pitch and yaw axes. The electronics unit 16 supplies three outputs $(\theta_R)$, $(\theta_P)$ and $(\theta_Y)$ to the display unit 18. Appropriate test buttons designated 17, 19 and 21 in FIG. 3 are provided at any appropriate location, so as to permit the operator to test selectively for misalignments with respect to each of the three axes. For example, the pushbutton 17 is pressed to test for misalignments with respect to the roll axis ($\theta_R$); the pushbutton 19 is depressed to test for misalignments with respect to the pitch axis ($\theta_P$), and the pushbutton 21 is actuated to test for misalignments with respect to the yaw axis ($\theta_Y$).

The electronics unit 16 is formed of two major subassemblies. The first sub-assembly (not shown) serves to provide the usual power and excitation to the gyroscopes, as well as temperature control, rate capture loops, and the like. This assembly is not shown since it may be of any conventional standard construction, and since it in and of itself forms no part of the present invention. The other sub-assembly of the electronics unit 16 is made up of appropriate logic circuitry represented by the block 50 in FIG. 4, which will be described, and which responds to the actuation of the respective pushbuttons 17, 19 and 21 to cause the system selectively to test for the above-mentioned various misalignments about the different axes. The electronics unit 16 also includes appropriate analo computation elements shown in FIG. 4, as well as analog/digital conversion circuitry represented by the block 52.

The various analog computation elements of FIG. 4 consist of usual analog computer components, such as inverters 60 and 62 and adders 64 and 66 for differencing the gyroscopic rates; as well as integrators 68 and 70 for integration of the difference outputs; integrators 72 and 74 for integration of the measured rates; and appropriate circuitry such as operational amplifiers 76 and associated multiplication logic circuits 77 and 79 for performing division operations.

As shown in FIG. 4, the terms $-\omega_P$ and $\omega_{P'}$ are applied to the adder 64, and the resulting output ($\omega_{P'} - \omega_P$) is integrated in the integrator 68 to produce the term $\overline{\Delta}_P$. The term $\omega_P$ is integrated in the integrator 72 to produce the term $\overline{\omega}_P$. The terms $\overline{\Delta}_P$ and $\overline{\omega}_P$ are divided in the circuit 76, 77 to produce the term $\theta_R$ (or $\theta_P$) = $\overline{\Delta}_P/\overline{\omega}_P$.

Likewise, the terms $-\omega_{R'}$ and $\omega_{R'}$ are applied to the adder 66, and the resulting output ($\omega_{R'} - \omega_R$) is integrated in the integrator 68 to produce the term $\overline{\Delta}_R$. The term $\omega_R$ is integrated in the integrator 74 to produce the term $\overline{\omega}_R$. The terms $\overline{\Delta}_R$ and $\overline{\omega}_R$ are divided in the circuit 78, 79 to produce the term $\theta_Y = \overline{\Delta}_R/\overline{\omega}_R$.

The resulting outputs are applied to the analog/digital conversion circuitry 52 which converts them into respective digital values $\theta_P$, $\theta_R$ and $\theta_Y$, properly scaled so that misalignments about the pitch, roll and yaw axes may be displayed directly in fractions of arc minutes, for example, by the display 18. The analog/digital conversion circuitry 52 may include, or be replaced, by an analog display, for example, which responds to the aforesaid analog input voltages to display readings corresponding to the boresight misalignments with respect to the various axes.

The block 50 in FIG. 4 includes appropriate circuitry for the real time monitoring of the pitch, roll and yaw rates ($\theta_P$), ($\theta_R$) and ($\theta_Y$) so as to establish the proper rate conditions for data observation, as required by the observation criteria table illustrated in FIG. 5.

For example, when the pushbutton 17 is depressed to test for boresight misalignments with respect to the roll axis, the integrators 68 and 72, as well as the conversion circuitry 52 are disabled until the proper rate conditions are met. Specifically, until $\Omega_P$ is greater than 200°/hour, $\Omega_R$ is less than 10° per hour, and $\Omega_Y$ is less than 50° per hour. Only when those conditions occur will the integrators 68 and 72, and the conversion circuitry 52 be enabled, so as to permit a misalignment measure about the roll axis ($\theta_R$) to be made.

Likewise, when the pushbutton 19 is depressed, to test misalignments with respect to the pitch axis ($\theta_P$), the integrators 68 and 72, as well as the conversion circuitry 52 is disabled until the test conditions shown in the column "Test $\theta_P$" of the block 50 in FIG. 4, and shown in the table of FIG. 5, are met. In the same manner, when the pushbutton 20 is depressed to test misalignments about the yaw axis ($\theta_Y$), the integrators 70 and 74 are disabled until the criteria shown in the column "Test $\theta_Y$" of the block 50, as well as in the table of FIG. 5, are met.

It will be observed from the diagram of FIG. 4, and from the observation criteria table of FIG. 5, that the carrier yaw rates are never required as signal rates. Also, ratio measurements permit use in all conditions up to saturation of the loops and/or read-out instrumentation, for example, 3,000°/hour. In carrying out the computation, the terms $\theta_R$ and $\theta_P$ are tested initially, and the larger is reduced. The display/control unit 18, for example, optically displays the three error signals $\theta_R$, $\theta_P$ and $\theta_Y$. Resolution of the display is preferably of the order of 1/10th of an arc minute within a range of 60 arc minutes with sign.

The operation of the system is predicated on the principle of harnessing the angular rates of the aircraft carrier to measure misalignments of the boresight axis. The master sensor unit 12 serves as a reference rate gyroscope with orthogonal input axes. As shown in FIGS. 1 and 2B, the master sensor unit is mounted so that one axis (A) defines the aircraft theoretical roll axis (armament data line), so that a second axis (B) defines the aircraft theoretical pitch axis, and so that a third axis (C) defines the aircraft theoretical yaw axis. The remote sensor unit 14, on the other hand, is mounted on a remote station of the aircraft in a position such that its axis (A) extends along the boresight axis of the equipment at that station.

Consider first the case where the roll and yaw rate input axes of the remote sensor unit are exactly parallel to the respective roll and yaw rate input axes of the master sensor unit. Then, if the components of the carrier's angular velocity about the roll and yaw axes are compared in the master and sensor units, the rates will be identical. Under such conditions, if the signal outputs of the parallel pair of axes of the master and remote sensor units are differenced, the rate of the carrier will be implicitly cancelled and any residual voltage or current will represent gyroscopic drift. As a calibration step in the system of the invention, this drift is electrically trimmed to be as nearly zero as possible.

Now consider the case where the remote sensor unit 18 is mounted on a boresight which is misaligned with respect to the armament data line, such that a misalignment occurs for the remote sensor unit 14 with respect to the master sensor unit 12 about the yaw axis (C).

The resulting differenced outputs of the pitch rates from the two units 12 and 14 will be directly proportional to the sine of the misalignment angle. Since the pitch rate is measured in real time by the sensor unit 12, the misalignment angle may be computed and displayed directly. The logic system 50, as described above, prevents confusion between the roll and pitch alignment errors.

The assumption is made that for small angles $\sin\theta \cong \theta$ and $\cos(90°-\theta) \cong 1$ for non-parallism of the input axes.

With reference to FIGS. 2A and 2B, the rate equations, ignoring drift terms, may be written as follows:

Master Sensor
$\omega_{R_M} = \Omega_R$
and
$\omega_{Y_M} = \Omega_Y$

Remote Sensor
$\omega_{R_R} = \Omega_R + \theta_Y\Omega_P + \theta_P\Omega_Y$
$\omega_{Y_R} = \Omega_Y - \theta_R\Omega_P - \theta_P\Omega_R$ where,
$\omega_{\square_M}$ = rate output (measured) by Roll, Pitch and Yaw axes of Master gyros
$\omega_{\square_R}$ = rate output measured by Roll and Yaw axes of the Remote gyro
$\theta_{R,P,Y}$ = misalignment of Remote gyro axes with respect to the Master Sensor triad about Roll, Pitch and Yaw
$\Omega_{R,P,Y}$ = ship's angular velocity vector as resolved into the Master triad about Roll, Pitch and Yaw Assuming real-time differencing:
For the roll axes, $$\overline{\omega_{R_R}} - \overline{\omega_{R_M}} = \theta_Y\Omega_P + \theta_P\Omega_Y \quad (1)$$

and for yaw axes, $$\overline{\omega_{Y_R}} - \overline{\omega_{Y_M}} = -\theta_R\Omega_P - \theta_P\Omega_R \quad (2)$$

It may be seen that a roll rate $\Omega_R$ is implicitly cancelled in the differencing of equation (1) and yaw rate $\Omega_Y$ is implicitly cancelled in the differencing of (2).

At this point, however, the terms $(\theta_P)$, $(\theta_R)$ and $(\theta_Y)$ are not uniquely determined. The block 50 of the system, however, monitors the constantly changing (mainly sinusoidal) rates $(\Omega_P)$, $(\Omega_R)$ and $(\Omega_Y)$; and it makes the data observation when any one of the rates is sufficiently small so that its product with the $(\theta)$ misalignment angle is negligible. Additionally, the other orthogonal term present for the measured axis must be large enough to yield the required accuracy. For example, a ratio of $\Omega_R/\Omega_P$ of 20 and a minimum value of $\Omega_R$ of about 200° per hour is acceptable. A sample time of one second is sufficiently long to smooth gyroscopic noise to less than 0.02° per hour.

The misalignment angle of interest is computed and displayed following the one second sample, for example:

$$\theta_Y = (\omega_{R'} - \omega_R/\Omega_P) \text{ (Radians)} \quad (3)$$

Analog computation at 1 percent accuracy is sufficient, and the con-ersion circuitry 52 is capable of providing a conversion for final display in the display 18 scaled in arc minutes.

Considering the gyroscopic drift rates, the rate equations are as follows, with the primed terms designating drift of the gyroscope 24 in the remote sensor unit 18:

$$\overline{\omega_{R_R}} - \overline{\omega_{R_M}} = \theta_Y\Omega_P - \theta_P\Omega_Y + (D_{R'F} - D_{RF}) + (D_{R'Q} - D_{RQ}) \quad (4)$$

and $\overline{\omega_{Y_R}} - \overline{\omega_{Y_M}} = \theta_R\Omega_P + \theta_P\Omega_R + (D_{Y'F} - D_{YF}) + (D_{Y'M} - D_{YM}) \quad (5)$ where,
$D_{\square_F}$ = fixed drift of Roll or Yaw axis
$D_{\square_Q}$ = quadrature g drift of Roll or Yaw axis
$D_{\square_M}$ = spin axis mass unbalance drift of Roll or Yaw axis.

Calibration is achieved by electrical trimming on a day-to-day basis. At the beginning of a series of boresight tests with the equipment of the invention, the remote sensor 18 initially is preferably directly mounted on the master sensor 12, so that the error terms $(\theta_P)$, $(\theta_R)$ and $(\theta_Y)$ each is approximately equal to zero. The residual drift is then entirely a steady state drift level which is electrically biased to a minimum for the two measures (Equations (4) and (5)). This electric biasing is preferably carried out at the output of the summing amplifier.

To achieve 0.5 milliradians, trim drift rates of about 0.8°/hour are required along with a minimum carrier rate of 200°/hours. Ship motion data is available to support such a requirement. A specific error analysis is as follows:

| Form | Value | Boresight Alignment Error MR | Sec |
|---|---|---|---|
| Gyro Drift δ D/Ω for = 200°/hr min | 0.08°/hr | 0.38 | 78 |
| Gyro 1A Position | 30 sec | 0.145 | 30 |
| Module Pad Stability | 20 sec | 0.1 | 20 |
| Gyro Scale Factor Mismatch for Parallel Axes Computation and Conversion Including Resolution | 0.1% | 0.25 | 52 |
| Gyro Noise (1 sec sample) | 0.02°/hr | 0.1 | 20 |
| Display Resolution | 0.1 min | 0.03 | 6 |
| Orthogonal Rate with In-Spec Alignment (0.5 mr) | 10°/hr | 0.03 | 6 |
| Analog Computation Scale Factor Error (measuring intermediate 5 min angle) | 1% | 0.01 | 3 |
| TOTAL (RSS) | | 0.5 | 103 |

The invention provides, therefore, an improved and relatively simple system which permits complete boresight alignment, including the roll axis, for the equipment of carrier-based aircraft to be carried out at sea with no constraints as to space, aircraft location, or heading of the carrier vessel. The equipment required in the system of the invention is relatively compact, and does not require any bulky support structure. Moreover, the equipment can be operated by medium skilled personnel, since it displays magnitude and sign of the misalignment angle directly, and does not require any particular operational calculations. Moreover, there is no need to jack or level the aircraft itself, and the requirement for external sighting targets is obviated.

It will be appreciated, of course, that although the system of the invention has been described in conjunction with the testing of carrier-based aircraft, the system may be used in conjunction with aircraft, or any other equipment, to test alignments of the axes of any equipment with respect to a data reference line. All that is required is the production of some means for producing angular rates, such as described in the preceding specification, so as to simulate the angular rates of the carrier.

While a particular embodiment has been shown and described, modifications may be made. It is intended in the following claims to cover all modifications which come within the spirit and scope of the invention.

What is claimed is:

1. Gyroscopic measuring apparatus for carrier-based aircraft, and the like, for measuring boresight misalignment of equipment on the aircraft with respect to a data reference line of the aircraft, said apparatus including:
   a first sensor unit to be mounted on the aircraft and including gyroscopic means for determining the angular rates of the carrier at the data line and for developing output signals representative of such rates;
   a second sensor unit to be mounted on the aforesaid equipment for determining the angular rates of the carrier at the boresight axis of the equipment and for developing output signals representative of such rates; and
   electronic circuit means connected to said first sensor unit and to said second sensor unit for comparing the output signals of said first and second sensor units to determine any misalignments of said boresight axis with respect to a parallel relationship with said data line.

2. The apparatus defined in claim 1, in which said first sensor unit includes two gyroscopes positioned at right angles to one another and having orthogonal input axes corresponding respectively to the roll, pitch and yaw axes of the carrier.

3. The apparatus defined in claim 2, in which said second sensor unit includes a gyroscope having an input axis aligned with said data line.

4. The apparatus defined in claim 2, in which said first sensor unit is mounted so that one of said input axes is parallel to said data line.

5. The apparatus defined in claim 1, and which includes display means connected to said electronic circuit means and responsive to said error output signals therefrom for displaying readings of misalignments of said boresight axis with respect to said data line.

6. The apparatus defined in claim 3, in which said electronic circuit means includes circuitry for differencing the output signals of said first and second sensor units for parallel pairs of the respective input axes thereof to provide indications of boresight misalignment with respect thereto.

7. The apparatus defined in claim 1, and which includes control means coupled to said electronic circuit means for causing said electronic circuit means to develop selectively error output signals representative of misalignments of said boresight axis in the roll, pitch and yaw directions with respect to said data line.

* * * * *